United States Patent [19]
Paquette

[11] Patent Number: 5,627,542
[45] Date of Patent: May 6, 1997

[54] METHOD OF MAKING A RADAR TRANSPARENT WINDOW MATERIAL OPERABLE ABOVE 2000° C.

[75] Inventor: David G. Paquette, Costa Mesa, Calif.

[73] Assignee: Loral Vought Systems Corporation, Grand Prairie, Tex.

[21] Appl. No.: 812,420

[22] Filed: Dec. 23, 1985

[51] Int. Cl.$^6$ .......................... H01Q 17/00; C04B 35/64
[52] U.S. Cl. .......................... 264/122; 264/56; 264/125; 264/668; 501/97; 501/98; 342/4
[58] Field of Search .......................... 264/1.2, 1.21, 264/1.22, 56; 342/4; 501/97, 98

[56] References Cited

U.S. PATENT DOCUMENTS

| | | | |
|---|---|---|---|
| 3,002,190 | 9/1961 | Olesky et al. | 501/97 |
| 3,292,544 | 12/1966 | Caldwell et al. | 501/98 |
| 3,396,396 | 8/1968 | Charlton et al. | 501/97 |
| 3,616,140 | 10/1971 | Copeland et al. | 501/98 |
| 3,813,252 | 5/1974 | Lipp et al. | 501/97 |
| 3,833,389 | 9/1974 | Komeya et al. | 501/98 |
| 4,097,293 | 6/1978 | Komeya et al. | 501/98 |
| 4,358,772 | 11/1982 | Leggett | 501/97 |
| 4,394,170 | 7/1983 | Sawaoka et al. | 501/97 |
| 4,438,051 | 3/1984 | Mitomo et al. | 264/1.2 |

*Primary Examiner*—Peter A. Nelson
*Attorney, Agent, or Firm*—Sidley & Austin

[57] ABSTRACT

A method is disclosed for making a microwave radar transparent window material operable at temperatures above 2000° C., and which material possesses high tensile strength, is resistant to erosion as well as particle impact at such temperatures, and is highly machinable. The method comprises: blending a powder mixture of 20–60% by weight silicon nitride, 12–40% boron nitride, 15–40% boron nitride, 15–40% silica, and 1–20% oxygen carrying sintering aids; (b) molding the mixture to shape as a preform; and (c) densifying the shaped preform into a monolithic window having high temperature stability and transparency at high temperatures.

8 Claims, No Drawings

METHOD OF MAKING A RADAR TRANSPARENT WINDOW MATERIAL OPERABLE ABOVE 2000° C.

BACKGROUND OF THE INVENTION

1. Field of the Invention

The invention relates to the art of making radar transparent ceramic windows and, in particular, to a monolithic microwave radar transparent radome which is strong and erosion resistant.

2. Description of the Prior Art

In various types of hypervelocity missiles and reentry vehicles carrying radar equipment, an antenna is mounted in the nose of the craft and is covered with an appropriate aerodynamic window or radome. The radome must be constructed of material which is strong enough to withstand the aerodynamic forces to which it may be subjected, and yet must be relatively distortion-free and highly transparent to radar energy, particularly at high temperatures. The missile will be traveling at supersonic speeds and such vehicles may be subjected to even higher temperatures upon reentry into certain atmospheric layers.

Accordingly, such radome or window should possess the following properties: (a) high microwave transmission efficiency at or above temperatures of 2000° C.; (b) resistance to dust, particle and rain erosion; (c) ablate only slightly at 2500° C.; (d) a high temperature transmission loss of less than three decibels at 2350° C.; (e) resistance to stress failure induced by large thermal differentials; and (f) readily machinable.

The earliest constructions for radomes have utilized ceramic type materials in monolithic, sandwich or multilayer constructions. Glass or glass fibers in combination with layers of foam or thermoplastics have been utilized as illustrated in U.S. Pat. Nos. 3,002,190 and 3,616,140. This type of construction loses strength and microwave transparency at high temperatures. Monolithic or sandwich wall constructions of alumina, fused silica or mullite have been fabricated and used. Alumina is very hard and resistant to rain erosion but is brittle and fails due to thermal stress and has a relatively high dielectric constant which promotes poor radar transmission (see U.S. Pat. Nos. 3,292,544 and 3,396,396). Monolithic radomes of mullite or Pyroceram 9606® have been fabricated, and while these are satisfactory for supersonic flight, they will fail due to thermal stress or rain erosion at velocities over about Mach 5. Monolithic silica material exhibits satisfactory radar transparency at high temperatures having a relatively low dielectric constant of 3.36. However, such silica material has poor rain erosion and particle impact resistance, is difficult to machine and, most importantly, exhibits excessive ablation at temperatures encountered by reentry vehicles.

Radomes or antenna windows fabricated as monolithic or multilayered structures have been made from nitrides including silicon nitride, boron nitride and silicon nitride layered with silica foam or boron nitride. Monolithic boron nitride or silicon nitride materials are unsatisfactory because they become opaque to radar at high temperatures. Even at lower temperatures the hexagonal form of boron nitride is insufficiently strong. In the cubic form, boron nitride cannot be made in sizes necessary for radomes. When boron nitride is combined with silicon nitride, the problem of high temperature radar transmission still remains an unsolved problem. A multilayer design consisting of silicon nitride and silica has poor high temperature radar transmissibility (see U.S. Pat. No. 4,358,772).

What is needed is a monolithic radar window material that can possess all the desirable physical characteristics outlined earlier above.

Therefore, it is an object of this invention is to provide a method of making a microwave radar transparent window material operable at temperatures above 2000 ° C., and which material possesses high tensile strength, is resistant to erosion as well as particle impact at such temperatures and at room temperature, and is highly machinable.

SUMMARY OF THE INVENTION

The method of making such microwave transparent material operable above 2000° C., comprises (a) to a powder mixture of 20–60% by weight silicon nitride and 12–40% boron nitride, add 15–40% silica and 1–20% oxygen carrying sintering aids; (b) mold the mixture to shape as a preform; and (c) densify the shaped preform by the simultaneous application of pressure and heat to form a monolithic window.

Preferably, the densification is carried out by hot isostatic pressing using preformed and vacuum evacuated quartz ampules as pressure transducing membrane. Densification may also be performed by uniaxial hot pressing in graphite dies. Preferably, the densification is carried out at a temperature of 1600°–1850° F., with a pressure of about 2000–15,000 psi. The densification can also be carried out at a temperature in the range of 1650°–1850° F., with a pressure in the range of about 2,000–15,000 psi. Preferably, the molding is performed by cold isostatic pressing, injection molding or slip casting.

It is advantageous to use sintering aids selected from the group consisting of MgO, CeO, $Al_2O_3$ and $Y_2O_3$ either individually or in combination.

The average particle size of the starting powders can be 0.5–5 microns for $Si_3N_4$, BN and oxygen carrying sintering aids. For $SiO_2$, particles ranging from 0.01–5 microns may be used. The starting purity for each of said powders is as follows: silicon nitride, 99.9% nominal purity but with commonly encountered contaminants of iron, calcium, sodium, potassium and unreacted (free) silicon less than about 50–100 parts per million each; boron nitride, 99.4% nominal purity; silica, 99.99% purity, and oxygen carrying sintering aids, 99.5% purity but with the same limits as for silicon nitride for iron, calcium, sodium, potassium and free silicon.

The resulting radar transparent window is characterized by a monolithic microstructure consisting of $Si_2ON_2$, suspended BN particles, silicon nitrides, various oxynitrides, and silicate materials associated with the oxide sintering aids and minimal unreacted silicon. Which of these said chemical phases may be present depends on the percentages of the constituents added for a particular formulation.

Depending upon the formulation of constituent percentages and processing conditions, the monolithic window will have a density of 2.4–2.9 gm/cc, a dielectric constant of 4.5–7, a loss tangent of less than 0.01, a tensile strength at high temperatures of 20,000–42,000 psi, an ability to only slightly ablate at 2500° C., high resistance to erosion with no mass loss in single particle impact test, a coefficient of thermal expansion of $2.5 \times 10^{-6}$ to $4 \times 10^{-6}$ $C.^{-1}$, and excellent machinability at room temperature.

The window thickness can range from a minimum of 0.05 inch to several inches depending upon the application and microwave frequency to be used.

DETAILED DESCRIPTION AND BEST MODE

To obtain a microwave radar transparent window material operable at temperatures above 2000° C., a method is disclosed herein which comprises: (a) uniformly blending a powder mixture of silicon nitride, boron nitride, silica and oxygen carrying sintering aids, all of the ingredients being introduced in prescribed weight percentages; (b) the mixture is molded to shape as a preform; and (c) the shaped preform is densified into a monolithic window having the desirable characteristics mentioned above.

Mixture

To a powder mixture of 20–60% by weight silicon nitride and 12–40% boron nitride, silica in an amount of 15–40% by weight is added as well as 1–20% by weight oxygen carrying sintering aids. The desired particle size for each of said powder ingredients is as follows: for silicon nitride the average or mean particle size is 1–2 microns with a maximum particle size of 10 microns; for boron nitride the average or mean particle size is 1 micron with a maximum particle size of 10 microns; for silica the average or mean particle size is can range from 0.01–2 microns, and the maximum particle size is 10 microns; for the oxygen carrying sintering aids the average or mean particle size is 1–2 microns with a maximum particle size of 10 microns, Correspondingly, the minimum starting purity for each of such starting materials is as follows: for silicon nitride, 99.9%; for boron nitride, 99.4%; for silica., 99.99%; and for oxygen carrying sintering aids, 99.5%.

If the silicon nitride starting material exceeds 60% by weight of the mixture, there is a progressive reduction of microwave transparency at the highest temperatures of operation; use of silicon nitride below 20% by weight will lead to reduced strength and increased ablation at very high temperatures encountered in a reentry environment. When boron nitride is either used in insufficient amounts, that is, below 12% by weight, or in excess amounts above 40% by weight of the mixture, the microwave transparency is detrimentally affected. When insufficient oxygen carrying sintering aids are employed, below 1%, the ability to obtain a minimum density of 90% in the final monolithic window is prevented. When excessive sintering aids are employed, dielectric properties are affected and excessive ablation at very high temperature will result. Excessive silica, above 40%, leads to poor machining and a susceptibility towards fragility. Inadequate silica, below 15%, detrimentally affects radar transmissibility.

The mixture is blended thoroughly by use of standard blending techniques such as ball milling. It is important that a high degree of homogeneity be achieved to obtain the physical characteristics desired.

A preferred powder mixture composition consists of 22% $SiO_2$, 23% BN, 46% $Si_3N_4$, 8% $Y_2O_3$, and 1% $Al_2O_3$.

Molding

The molding is carried out by use of one of several techniques, including: cold isostatic pressing or slip casting. For purposes of the best mode, it is preferred that cold isostatic pressing be employed which is carried out by introducing the blended and milled powders into a closed, flexible polymer mold with the desired shape and compacting the powders at room temperature in the mold with pressures from 5000–15,000 psi.

Prior to densification, the molded shape may be encapsulated with glass ampules pulled under vacuum which provides a hermetic coating which comes off after the densification operation.

Densification

The shaped preform is then hot compacted into a monolithic window, preferably by being subjected to the temperature range of 1600°–1850° C. and under a pressure of 2000–15,000 psi for a period of 1–4 hours or whatever time is necessary to achieve at least 90% density in the material. If the temperature of hot compacting is below 1600° C., the net result is inadequate densification. If the pressure is below 2000 psi, the result is also inadequate densification. Hot compaction may be uniaxial hot pressing in graphite dies or hot isostatic pressing inside hermetic glass containers.

Resulting Product

The product resulting from practice of the above method is a monolithic microwave radar transparent window which possesses the following characteristics: a microstructure consisting of $Si_2ON_2$, with suspended boron nitride particles, silicon nitride, various oxynitrides and silicate compounds associated with the oxide sintering aids, and minimal unreacted amounts of silicon. The monolithic window has a density of 2.4–2.9 gm/cc, a microwave transparency characterized by a dielectric constant of 4.5–7, and loss tangent of less than 0.01, a high temperature transmission loss of less than 3 decibels at 2350° C. (electrical attenuation losses), and ablation recession slightly greater than or less than the recession rate of a tape wrapped carbon phenolic heatshield material. The latter is observed by a test whereby a carbon phenolic heatshield is assembled together with a sample of window material and subjected to high temperature heat sources to observe the ablation recession. The window material has a tensile strength at high temperatures of 20,000–42,000 psi, an ability only slightly ablate at 2500° C., high resistance to erosion with no mass loss in single particle impact tests, a coefficient of thermal expansion of $2.5 \times 10^{-6}$ to $4 \times 10^{-6}$ $C.^{-1}$, and excellent machinability at room temperature. For some window materials, the monolithic microstructure can have a tensile strength at high temperatures of between about 40,000 and 45,000 psi.

The thickness of the monolithic window can be varied from 0.05 inch to several inches depending upon the application and microwave frequency to be used.

Examples

In Table I, the results of testing materials fabricated with various chemical compositions and processing parameters is displayed. Sample 1 represents the preferred chemistry and processing, while samples 2–6 represent deviations from the chemical limitations of the powder ingredients. Samples 7 and 8 represent, respectively, utilization of too low a hot pressing temperature and too low a hot pressing pressure.

Each of the samples was prepared by blending powder mixtures as indicated for sample 1, except as deviated by the notation for the rest of the samples. Each of the samples was hot pressed at 1680° C., except for that noted in sample 7. Pressure was 4000 psi, except as noted in sample 8. Each of the resulting hot pressed monolithic windows was then tested for a variety of physical characteristics, including: thermal stability which measures material loss at 2400°–2600° C., microwave transmission capability by measurement of the dielectric constant, and loss tangent as well as high energy power loss in terms of decibels. The material was also measured as to tensile strength, erosion resistance and machinability.

While particular embodiments of the invention have been illustrated and described, it will be obvious to those skilled in the art that various changes and modifications may be made without departing from the invention, and it is intended ho cover in the appended claims all such changes and modifications as fall within the true spirit and scope of the invention.

TABLE I

| Sample | Chemistry | Particle Size | Purity | Processing Temp. °C. | Processing Press. psi | Thermal Stability Loss at 2400–2600° C. |
|---|---|---|---|---|---|---|
| 1 | 46% $Si_3N_4$<br>23% BN<br>22% $SiO_2$<br>8% $Y_2O_3$<br>1% $Al_2O_3$ | 2 Microns<br>2 Microns<br>.01 Microns<br>2 Microns<br>2 Microns | 99.9<br>99.5<br>92.99<br>92.5<br>99.8 | 1680 | 4000 | Ablates Slightly |
| 2 | Same Except<br>68% $Si_3N_4$<br>0% $SiO_2$ | 2 Microns<br>2 Microns<br>.01 Microns<br>2 Microns<br>2 Microns | 99.9<br>99.5<br>92.99<br>92.5<br>99.8 | 1680 | 4000 | Ablates Slightly |
| 3 | Same Except<br>48% BN<br>35% $Si_3N_4$<br>11% $Si_2$ | 2 Microns<br>2 Microns<br>.01 Microns<br>2 Microns<br>2 Microns | 99.9<br>99.5<br>92.99<br>92.5<br>99.8 | 1680 | 4000 | Ablates Slightly |
| 4 | Same Except<br>15% $Si_3N_4$<br>46% $Si_2$ | 2 Microns<br>2 Microns<br>.01 Microns<br>2 Microns<br>2 Microns | 99.9<br>99.5<br>92.99<br>92.5<br>99.8 | 1680 | 4000 | More Ablation |
| 5 | Same Except<br>5% BN<br>54% $Si_3N_4$<br>32% $SiO_2$ | 2 Microns<br>2 Microns<br>.01 Microns<br>2 Microns<br>2 Microns | 99.9<br>99.5<br>92.99<br>92.5<br>99.8 | 1680 | 4000 | Ablates Slightly |
| 6 | Same Except<br>25% MgO For<br>$Y_2O_3$ And<br>$Al_2O_3$ | 2 Microns<br>2 Microns<br>.01 Microns<br>2 Microns<br>2 Microns | 99.9<br>99.5<br>92.99<br>92.5<br>99.8 | 1680 | 4000 | Ablates Slightly |
| 7 | Same as 1 | 2 Microns<br>2 Microns<br>.01 Microns<br>2 Microns<br>2 Microns | 99.9<br>99.5<br>92.99<br>92.5<br>99.8 | 1600 | 4000 | Ablates Slightly |
| 8 | Same as 1 | 2 Microns<br>2 Microns<br>.01 Microns<br>2 Microns<br>2 Microns | 99.9<br>99.5<br>92.99<br>92.5<br>99.8 | 1750 | 1500 | Ablates Slightly |

| Sample | Microwave Transmission Dielectric Constant | Microwave Transmission Loss Tangent | Microwave Transmission ab Power Loss at 2350° C. | Tensile Strength (High Temp.) | Erosion Resistance | Machinability | Comments |
|---|---|---|---|---|---|---|---|
| 1 | 5–6 | <.01 | 3db | 25–33 | No Mass Loss in Single Particle Impact | Very Good | |
| 2 | 8 | <.01 | 25db | 30–42 | No Mass Loss in Single Particle Impact | Very Good | |
| 3 | 5–6 | ≧.01 | 30db | 10–15 | No Mass Loss in Single Particle Impact | Very Good | Incomplete densification, 85% |
| 4 | 4.5–5.5 | ≧.01 | 1–2db | 10–15 | Some Mass Loss | Very Good | |
| 5 | 6–7 | ≧.01 | 10–20db | 30–50 | No Mass Loss | Poor | |
| 6 | 5–6 | ≧.01 | 3db | 25–33 | No Mass | Very Good | |

TABLE I-continued

| | | | | | Loss | | |
|---|---|---|---|---|---|---|---|
| 7 | 4.5–5.5 | ≧.01 | 5db | 10–15 | Some Mass Loss | Very Good | Incomplete densification |
| 8 | 5–6 | ≧.01 | 5db | 10 | Some Mass Loss | Very Good | Sample incompletely densified and surface decomposed during processing. |

I claim:

1. A method of making a microwave radar transparent window material operable at temperatures above 2000° C., comprising:
   (a) blending a powder mixture of 20–60% by weight silicon nitride, 12–40% boron nitride, 15–40% $SiO_2$, and 1–20% oxygen carrying sintering aids;
   (b) molding said mixture to shape a preform; and
   (c) densifying the thus shaped preform by simultaneous application of heat and pressure to form a monolithic window.

2. The method as in claim 1, in which said densification is carried out at a temperature of 1650°–1850° C. with a pressure of 2000–15,000 psi.

3. The method as in claim 1, in which the shaped preform is hermetically coated prior to densification by encapsulating said shaped preform with quartz ampules pulled under vacuum.

4. The method as in claim 1, in which step (b) is carried out by one of injection molding, cold isostatic pressing, and slip casting.

5. The method as in claim 1, in which the oxygen carrying sintering aids are selected from the group consisting of $Y_2O_3$, MgO, CeO, $Al_2O_3$.

6. The method as in claim 1, in which the average particle sizes of the ingredients of said powder mixture comprise 1–2 microns for $Si_3N_4$, 1–2 microns for BN, 0.01–2 microns for $SiO_2$, and 1–2 microns for oxygen carrying sintering aids.

7. The method as in claim 1, in which the maximum particle size of the ingredients of said powder mixture is 10 microns.

8. The method as in claim 1, in which the minimum purities of the ingredients of said powder mixture comprise 99.9% for $Si_3N_4$, 99.5% for BN, 99.99% for $SiO_2$, and 99.5% for the oxygen carrying sintering aids.

* * * * *